Nov. 12, 1957     E. F. SMITH     2,812,990
SELF-LEVELING DISPENSER
Filed May 29, 1953
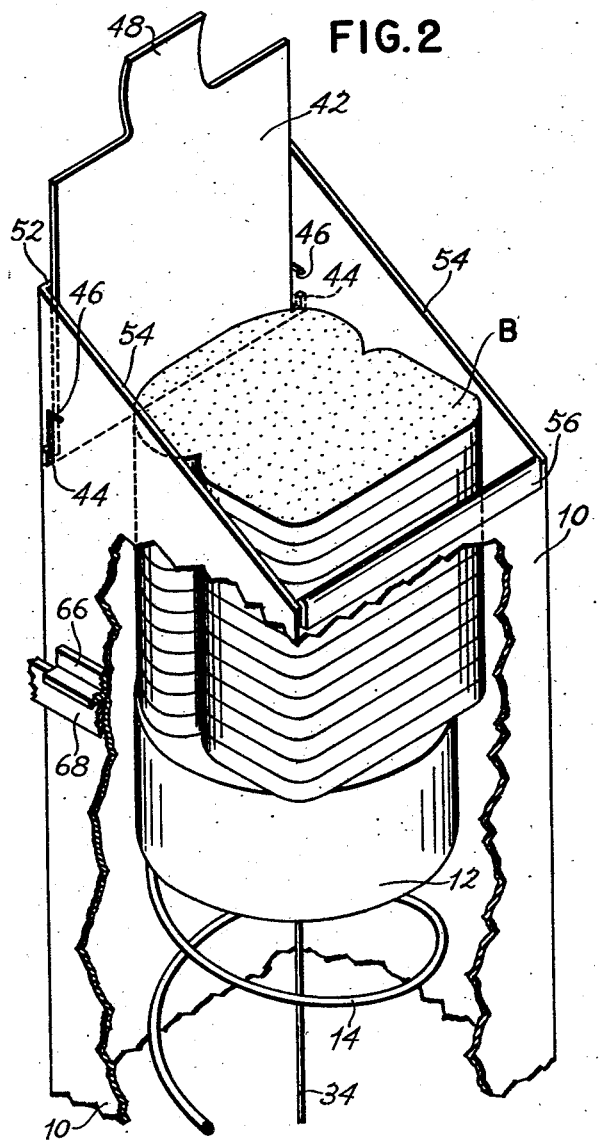
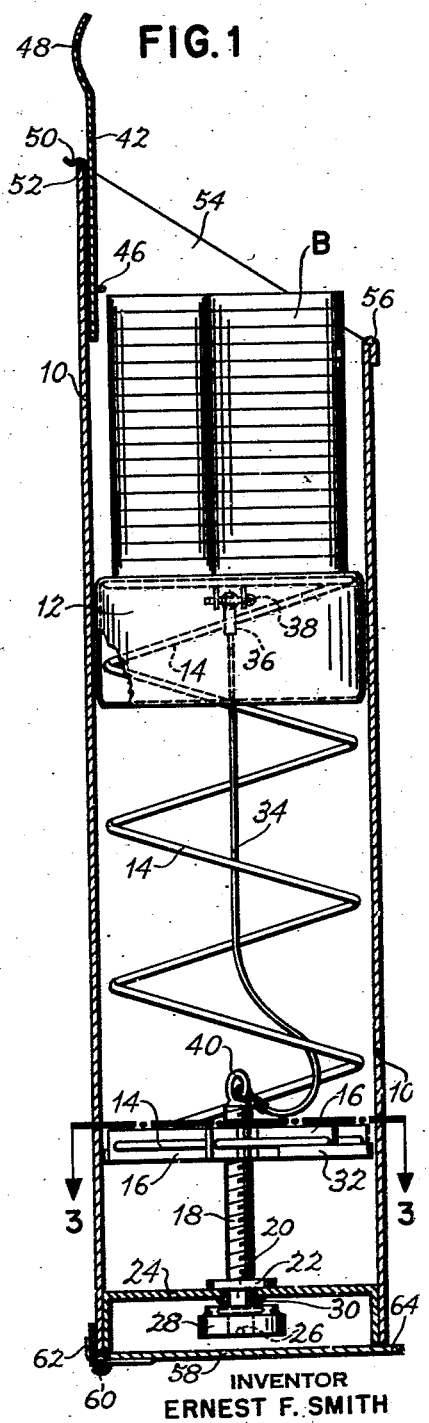
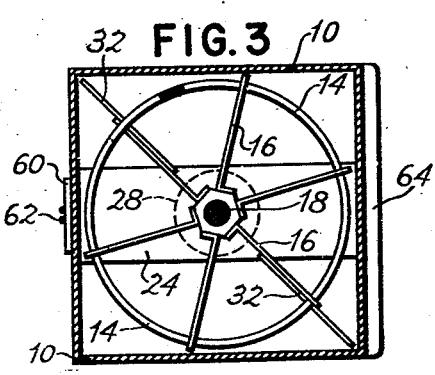
INVENTOR
ERNEST F. SMITH
BY
ATTORNEY United States Patent Office 2,812,990
Patented Nov. 12, 1957

2,812,990
SELF-LEVELING DISPENSER

Ernest F. Smith, Richmond Hill, N. Y., assignor to American Machine & Foundry Co., a corporation of New Jersey Application May 29, 1953, Serial No. 358,255

4 Claims. (Cl. 312—71)

This invention relates to a self-leveling, storing and dispensing apparatus, particularly one which is adapted for storing and dispensing stacked slices of bread.

Various types of dispensers have been developed heretofore, but none of them has been found satisfactory for storing stacked slices of bread. Dispensers of this latter type must not have any crushing effect on the bread slices and should also provide means to protect the bread from contamination. Such dispensers must also have the advantage that they will not accumulate crumbs in places which are inaccessible to cleaning and which will also allow the crumbs to automatically clear themselves away without accumulating upon the slices of bread.

The present bread storing and dispensing apparatus has the advantage that it does not exert any force on the top slice of bread which will render it objectionable, because the entire stack of bread is so counterbalanced that the top slice is always kept at substantially the same level.

Another advantage of this invention is that slices of bread can be stored in a dispenser housing that is substantially rectangular in cross-section so as to provide lateral support for the stack of bread.

Another advantage is that a supporting carrier is provided which provides a flat support which allows crumbs to fall away from the carrier and at the same time permits the carrier to have a slight rotation when it rises or descends, and still maintains the carrier free from tilting due to its close contact with the side walls of the dispenser housing.

Another advantage of this invention is that a cover for the material be provided which is adaptable for use with a self-leveling dispenser which will not deform slices of bread or restrict the upward or downward movement of the carrier.

Other objects and features of the invention will appear as the description of the particular physical embodiment selected to illustrate the invention progresses. In the accompanying drawings, which form a part of this specification, like characters of reference have been applied to corresponding parts throughout the several views which make up the drawings.

Fig. 1 is a sectional side elevation of the self-leveling sliced bread dispenser, Fig. 2 is an isometric view with parts broken away illustrating the upper portion of the self-leveling bread dispenser, and Fig. 3 is a sectional plan view taken on line 3—3 of Fig. 1.

With reference to the drawings, the self-leveling bread dispenser consists of an elongated, square or rectangular shell or housing 10 provided with a circular, cup-shaped carrier platform 12 slideably supported within said housing on the upper end of a counterbalancing compression spring 14. The calibrated spring 14 is of the type which is compressed and expanded at a uniform rate which is calibrated to support articles of a predetermined weight and thickness so that the uppermost article is always maintained at a constant level in substantially the same manner as described in U. S. Patent No. 2,626,727, issued to William J. Gibbs and Carl H. Larsen on January 27, 1953

The lower end of the compression spring is supported by and suitably attached to a multi-arm spider shaped member 16. By employing a round carrier inside of a square shell applicant has found that he has avoided having the carrier hang up on account of friction and at the same time while providing a flat supporting surface for the bottom of the bread stack he has also enabled falling bread crumbs to fall downwardly past the carrier into the bottom of the dispenser. A round carrier has the further advantage that it allows for a slight amount of rotation when the carrier ascends and descends and still provides support on four sides by the skirted carrier engaging with the sides of the rectangular shell or housing.

The central hub portion of member 16 engages with the threaded portion 18 of a vertical stud or post 20. The post 20 is provided with a flange 22 which rests on top of a supporting bridge 24 while the lower end of said post 20 protrudes through a hole in said bridge which is suitably secured to the bottom portion inside of the square shaped housing 10.

The lower end of post 20 is also provided with a pin 26 which extends laterally from said post 20 and engages with a suitable slot and indentation formed in the removable knob 28. The knob 28 serves to lock the post 20 to the bridge 24 and also provides means for rotating the post 20. A compression spring 30, confined between the bottom side of said bridge 24 and knob 28, provides sufficient pressure between bridge 24 and knob 28 to keep pin 26 in engagement with the indentation of knob 28 while allowing sufficient freedom for turning post 20 by means of knob 28.

Since the spring supporting spider shaped member 16 engages with the threaded portion 18 of post 20, a turning of knob 28 will effect a lowering or raising of the cup shaped platform 12, and thus provide means for positioning the top of the material supported on said platform 12 at the desired level. In order to prevent the spring supporting member 16 from turning the latter is provided with a pair of guide fingers 32 (Fig. 3) which extend from said member 16 into diagonally opposite corners of the square shaped tubular housing 10.

A suitable elongated, flexible, non-extensible member 34 such as a chain, wire or cord is provided to provide means to limit the extent of the expansion of spring 14 and thereby control the distance the carrier platform can move upward when no weight is carried by the latter and the unit is empty. The upper end of member 34 is secured to the underneath side of the carrier platform 12 by means of an eyelet 36 and pin bracket 38 while the lower end of said member 34 is suitably attached to a ring or eyelet 40 provided at the top end of post 20.

In order to keep the slices of bread B stored in the dispenser in sanitary and fresh condition the top end of the dispenser housing is provided with an easy retractable cover plate 42. The cover plate 42 is secured at its rear edge and is equipped with a pair of L-shaped lugs 44 which engage with a pair of rectangular slots 46 provided in the two opposite side walls of the housing thus forming a self-adjusting hinge for said cover plate 42. When the latter is closed it automatically adjusts itself to a level which is determined by the top of the stack of sliced bread supported on the carrier platform. As a consequence, the force exerted by the counterbalancing spring 14 does not effect any damaging pressure on the slices of bread as might occur with a conventional stationary hinge.

A suitably shaped tab or lifter lug 48 is provided for opening said cover plate 42 and a cam-shaped hook 50 is provided to engage with the top edge of the rear wall of housing 10 to keep the cover plate 42 in an upright and open position. The horizontal portions of the rectangular slots 46 are designed to permit easy removal of the cover plate 42 for cleaning purposes by lifting the cover plate horizontally and edging the L-shaped lugs 46 of the latter out of said horizontal positions.

By providing the top end of the dispenser housing 10 with a high rear wall 52, two angular edged or inclined side walls 54 and a low front wall 56 the bread slices B can only be removed from the front and an upsetting of the column of slices and particularly a disarrangement of the top slices by careless persons has been avoided.

The bottom end of the dispenser housing 10 is also provided with a cover plate 58 which is attached to said housing by means of a hinge 60. A suitable spring 62 keeps said cover plate 58 closed to accumulate crumbs which may drop off the bread slices in the dispenser. By depressing a lip 64 of the bottom cover plate 58 the plate 58 may be opened to permit the orderly removal of the accumulated crumbs.

The outer sides of the side walls of the housing 10 may also be provided with suitable supporting sails 66 which can be used to support the dispenser in a suitable frame 68 or an opening of a counter table if desired.

The invention hereinabove described may be varied in construction within the scope of the claims, for the particular device selected to illustrate the invention is but one of many possible embodiments of the same. The invention, therefore, is not to be restricted to the precise details of the structure shown and described.

What is claimed is:

1. A self-leveling, storing, and dispensing apparatus comprising a square, elongated shell having openings at the upper and lower ends thereof, a circular carrier, a depending skirt formed on said carrier to maintain the carrier free from tilting, a stack of bread slices supported on said carrier, said bread and carrier having free unrestricted up and down movement within said shell and through the upper end thereof, an open framework mounted at the lower end of said square shell for supporting a spring, a calibrated compression spring connected at its lower end to said spring support and at the upper end to the underside of said carrier to exert a force thereon so as to raise and lower said carrier a distance varying with the amount of bread slices supported on said carrier to maintain the top of said stack at a constant, pre-determined elevation with respect to the upper end of said shell, said circular carrier, spring, spring support and lower opening allowing free passage of bread crumbs through said square shell.

2. A self-leveling, storing, and dispensing apparatus comprising a square, elongated shell having openings at the upper and lower ends thereof, a circular carrier, a depending skirt formed on said carrier to maintain the carrier free from tilting, a stack of bread slices supported on said carrier, said bread and carrier having free unrestricted up and down movement within said shell and through the upper end thereof, a cover plate freely movable up and down by the stack of bread slices on said carrier, slots formed in the upper end of said shell, guide members extending from said cover plate through said slots, an open framework mounted at the lower end of said square shell for supporting a spring, a calibrated compression spring connected at its lower end to said spring support and at the upper end to the underside of said carrier to exert a force thereon so as to raise and lower said carrier a distance varying with the amount of bread slices supported on said carrier to maintain the top of said stack at a constant, pre-determined elevation with respect to the upper end of said shell, said circular carrier, spring, spring support and lower opening allowing free passage of bread crumbs through said square shell.

3. A self-leveling, storing, and dispensing apparatus comprising a square, elongated shell having openings at the upper and lower ends thereof, a circular carrier, a depending skirt formed on said carrier to maintain the carrier free from tilting, a stack of bread slices supported on said carrier, said bread and carrier having free unrestricted up and down movement within said shell and through the upper end thereof, an open framework mounted at the lower end of said square shell for supporting a spring, a calibrated compression spring connected at its lower end to said spring support and at the upper end to the underside of said carrier to exert a force thereon so as to raise and lower said carrier a distance varying with the amount of bread slices supported on said carrier to maintain the top of said stack at a constant, pre-determined elevation with respect to the upper end of said shell, said circular carrier, spring, spring support and lower opening allowing free passage of bread crumbs through said square shell, and a hinged spring closed door pivoted along one edge of the bottom of said shell to collect bread crumbs falling downwardly over the sides of said circular carrier through said shell.

4. A self-leveling, storing, and dispensing apparatus comprising a square, elongated shell having openings at the upper and lower ends thereof, a circular carrier for supporting a stack of bread slices, a depending skirt formed on said carrier to maintain the carrier free from tilting, said bread and carrier having free unrestricted up and down movement within said shell and through the upper end thereof, a cover plate freely movable up and down by the stack of bread slices on said carrier, slots formed in the upper end of said shell, guide members extending from said cover plate through said slots, an open framework mounted at the lower end of said square shell for supporting a spring, a calibrated compression spring connected at its lower end to said spring support and at the upper end to the underside of said carrier to exert a force thereon so as to raise and lower said carrier a distance varying with the amount of bread slices supported on said carrier to maintain the top of said stack at a constant, pre-determined elevation with respect to the upper end of said shell, said circular carrier, spring, spring support and lower opening allowing free passage of bread crumbs through said square shell, and a hinged spring closed door pivoted along one edge of the bottom of said shell to collect bread crumbs falling downwardly over the sides of said circular carrier through said shell.

References Cited in the file of this patent

UNITED STATES PATENTS

| | | |
|---|---|---|
| 564,540 | Schwechler et al. | July 21, 1896 |
| 1,064,503 | Lewis et al. | June 10, 1913 |
| 1,513,248 | Johnson | Oct. 28, 1924 |
| 1,798,038 | Scott et al. | Mar. 24, 1931 |
| 2,083,843 | Hicks | June 15, 1937 |
| 2,150,306 | Wessman | Mar. 14, 1939 |
| 2,609,265 | Larsen | Sept. 2, 1952 |

FOREIGN PATENTS

| | | |
|---|---|---|
| 546,531 | Germany | Mar. 15, 1932 |
| 24,917 of 1935 | Australia | Sept. 2, 1936 |